US005265202A

United States Patent [19]

Krueger et al.

[11] Patent Number: 5,265,202

[45] Date of Patent: Nov. 23, 1993

[54] METHOD AND SYSTEM FOR ACCESSING VISUALLY OBSCURED DATA IN A DATA PROCESSING SYSTEM

[75] Inventors: Leroy A. Krueger; Edward S. Rozmiarek, both of Marietta, Ga.; James G. Tench, Jr., Lexington, Ky.

[73] Assignee: International Business Machines Corporation, Armonk, N.Y.

[21] Appl. No.: 937,926

[22] Filed: Aug. 28, 1992

[51] Int. Cl.[5] .......... G06F 15/62

[52] U.S. Cl. .......... 395/158; 395/157; 395/153; 345/4; 345/113

[58] Field of Search .......... 395/157, 158, 160, 153; 340/716, 721, 734

[56] References Cited

U.S. PATENT DOCUMENTS

| | | | |
|---|---|---|---|
| 4,559,705 | 12/1985 | Hodge et al. | 340/734 |
| 4,616,336 | 10/1986 | Robertson et al. | 340/721 |
| 4,642,790 | 2/1987 | Minshull et al. | 395/158 |
| 4,679,040 | 7/1987 | Yan | 340/747 |
| 4,692,757 | 9/1987 | Tsuhara et al. | 340/721 |
| 4,727,365 | 2/1988 | Bunker et al. | 340/728 |
| 4,752,773 | 6/1988 | Tagawa et al. | 340/721 |
| 4,758,892 | 7/1988 | Bloomfield | 358/183 |
| 4,827,253 | 5/1989 | Maltz | 340/743 |
| 4,853,784 | 8/1989 | Abt et al. | 358/181 |
| 4,868,765 | 9/1989 | Diefendorff | 395/157 |
| 4,947,240 | 8/1990 | Hausdorfer | 358/22 |
| 4,992,781 | 2/1991 | Iwasaki et al. | 340/747 |
| 5,017,143 | 5/1991 | Backus et al. | 434/236 |
| 5,046,001 | 9/1991 | Barker et al. | 340/721 |
| 5,075,675 | 12/1991 | Barker et al. | 395/157 |

FOREIGN PATENT DOCUMENTS

| | | |
|---|---|---|
| 2162726 | 2/1986 | United Kingdom . |
| 2179227 | 2/1987 | United Kingdom . |

*Primary Examiner*—Heather R. Herndon
*Assistant Examiner*—N. Kenneth Burraston
*Attorney, Agent, or Firm*—Andrew J. Dillon

[57] ABSTRACT

A method and system for accessing visually obscured data in a data processing system having a computer application displayed concurrently with a video image in a window which partially overlaps the computer application. The location of the video image within the window is maintained in relation to the visually obscured data within the computer application. The video image, which is comprised of a plurality of lines of video data, is then temporarily altered to a translucent state by omitting selected lines of video data. This renders the video image partially visible, allowing the visually obscured data within the computer application to be seen through the video image. The visually obscured data may now be visually accessed through the video image.

4 Claims, 2 Drawing Sheets

METHOD AND SYSTEM FOR ACCESSING VISUALLY OBSCURED DATA IN A DATA PROCESSING SYSTEM

BACKGROUND OF THE INVENTION

1. Field of the Invention

The present invention relates in general to the field of data processing systems, and in particular to a method and system for accessing data within a computer application program. Still more particularly, the present invention relates to a method and system for accessing visually obscured data within a computer application displayed concurrently with a video image within a window which partially overlaps data within the computer application.

2. Description of the Prior Art

A relatively recent advance in the computer arts allows a user to view a video image on a computer display. The video image can be, for example, broadcast television or video input from a video cassette recorder. Typically, an external converter unit or a video card is utilized to allow receipt and display of the video image.

The video is controlled by the user by programming various components of the video with the computer. These components include the color and tint of the image, the size of the screen, and the volume of the sound. Additionally, if the computer has multi-tasking capabilities, the video image can be operating simultaneously with a computer application program. For example, the display screen of the computer may be displaying computer graphics while the video image is running in the background. By entering a command, the computer graphics and the video image switch places, so that the video image is displayed on the screen with the computer graphics running in the background.

Problems arise, however, for a user working with this system. If the user is working with a computer application which requires input from the user at various times of operation, the user is forced to repeatedly switch between the two screens. Repeatedly switching between two screens is very inefficient and bothersome.

A more desirable option is to have the video image and the computer graphics simultaneously displayed on a single display. The computer graphics and video image are displayed concurrently, with the video image displayed in a window which partially overlaps the computer graphics display. In this manner, a user can be working on a computer application and watch a video program at the same time.

If a user has a system which allows him to view both concurrently, however, data within the computer application may be visually obscured by the video image within the window. This forces the user to close the window displaying the video image before the user can access the data obscured by the window. Closing the window every time data is obscured in order to access that data is also very inefficient and bothersome.

Therefore, it would be desirable to provide a method and system for accessing visually obscured data in a data processing system having a computer application displayed concurrently with a video image in a window which partially overlaps the computer application.

SUMMARY OF THE INVENTION

It is therefore one object of the present invention to provide a method for accessing visually obscured data in a data processing system having a computer application displayed concurrently with a video image within a window which partially overlaps the computer application.

It is another object of the present invention to provide a method for accessing visually obscured data in a data processing system having a computer application displayed concurrently with a video image within a partially overlapping window by permitting a user to see through the video image to visually access data within the computer application.

It is yet another object of the present invention to provide a method for rapid and efficient access of visually obscured data in a data processing system having a computer application displayed concurrently with a video image within a partially overlapping window.

The above as well as additional objects, features, and advantages of the invention will become apparent in the following detailed description. The location of the video image within the window is maintained in relation to the visually obscured data within the computer application. The video image, which is comprised of a plurality of lines of video data, is then temporarily altered to a translucent state by omitting selected lines of video data. This renders the video image partially visible, allowing the visually obscured data within the computer application to be seen through the video image. The visually obscured data may now be visually accessed through the video image.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
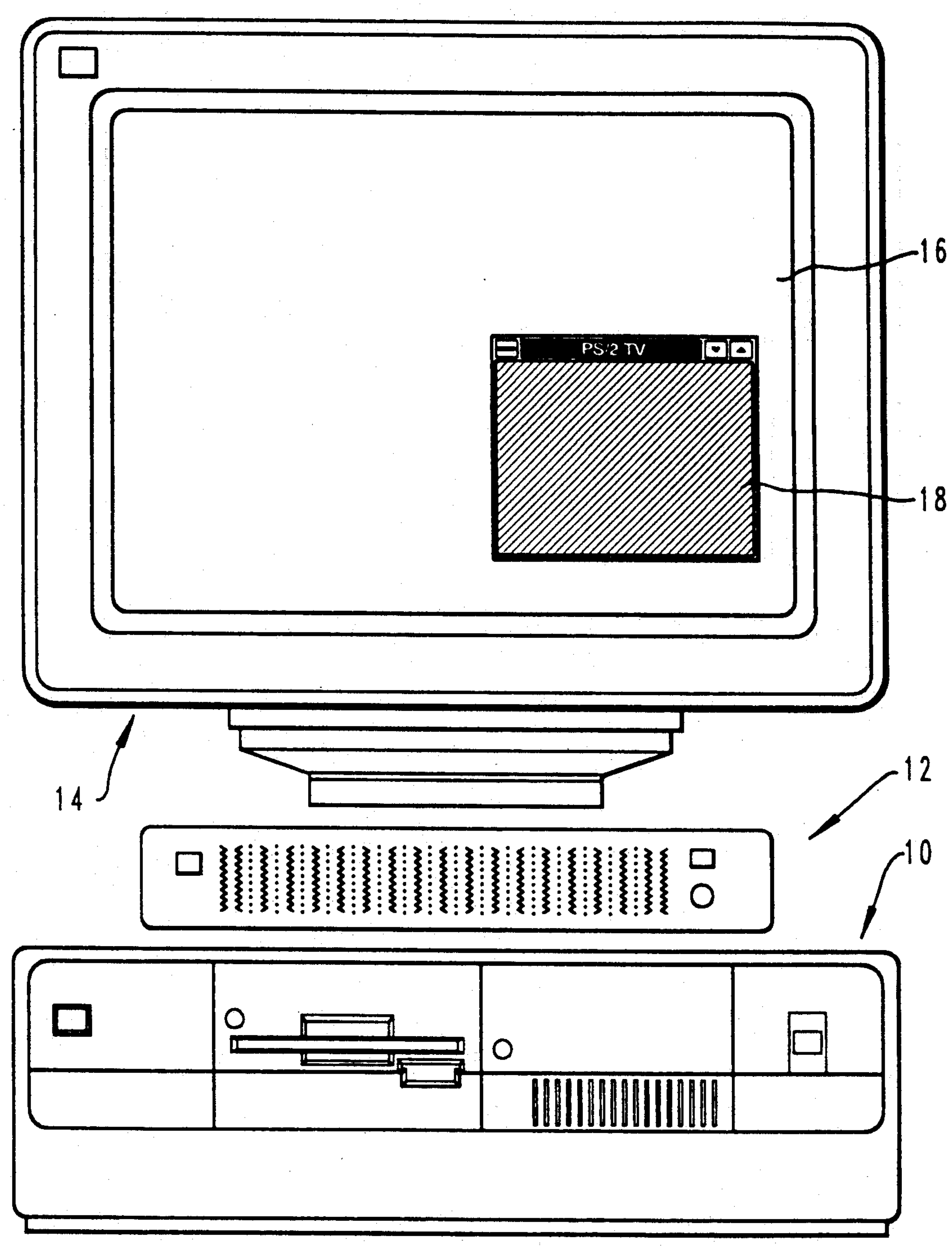
FIG. 1 is a pictorial view illustrating a data processing system having a computer application displayed concurrently with a video image.

With reference now to the figures and in particular with reference to FIG. 1, a data processing system is illustrated having computer graphics displayed concurrently with a video image. The data processing system includes a computer 10, a converter unit 12, and a computer display 14. The converter unit 12 allows a user to view both computer graphics and a video image on the same computer display 14. The converter unit 12 may be, for example, an IBM PS/2 TV unit. An alternative to converter unit 12 is a video card installed within computer 10. One example of a video card is "PC Vision" sold by 50/50 Microelectronics. The source of the video image can be either a channelized source, such as broadcast or cable television, or a base-band output like that supplied by many video cassette recorders and video disc players.

The computer display 14 has a display screen 16 which, in FIG. 1, is displaying a computer application concurrently with an interlaced video image within a window 18. Window 18 partially overlaps the computer application. At various times, data within the computer application may be visually obscured by window 18. A method and system for accessing the visually obscured data within the computer application will be described below.

As known in the art, a video image is typically broadcast in a two field per frame interlaced mode at a frame rate of thirty frames per second and a field rate of sixty fields per second, with a horizontal sweep rate of 15,734 hertz. 525 lines of video data are generated for each frame, but only about 480 lines are actually used to make the video image. Each field contains one-half of the total picture. The odd numbered lines of video data are contained in the first field, and the even numbered lines in the second field.

To display the video image, the odd numbered lines in the first field are traced horizontally across a display. After the first field is traced across the display, the even numbered lines in the second field are traced horizontally across the display. A short delay exists between tracing the first field and the second field. The net result of the delay is to shift the lines in the second field down one line so that the even numbered lines are traced between the odd numbered lines of the first field.

In contrast, the typical computer display operates in a non-interlaced mode and has a frame and field rate of 60 or 70 fields/frames per second, with a horizontal sweep rate of 31,468 hertz. A non-interlaced image has one field per frame and all of the image lines are contained within each field. Consequently, in order to be able to display the video image on the computer display, the interlaced image of the video needs to be converted to a non-interlaced image.

In the preferred embodiment, the interlaced image of the video is converted to a non-interlaced image by treating each field within the dual frame video image as two distinct fields. Therefore, to display the video image, each line of a 262 line field is replicated, and the 480 lines are then traced across the display screen 16. By writing a single line of video data to the display screen 16 twice, the horizontal sweep rate of the video matches the horizontal sweep rate of the computer display 14.

After the first field is traced on the display screen 16, the second field within the video image is replicated and traced on the display screen 16, tracing over all but the first line of the display screen 16. The human eye integrates the first and second fields on the display screen 16, yielding a spatially correct, flicker free image. By performing interlace to non-interlace conversion in this manner, only one line of the video data needs to be buffered at one time to allow for replication of the line on the display screen 16. This significantly reduces the cost of the memory required to contain the image data.

Figure 2:
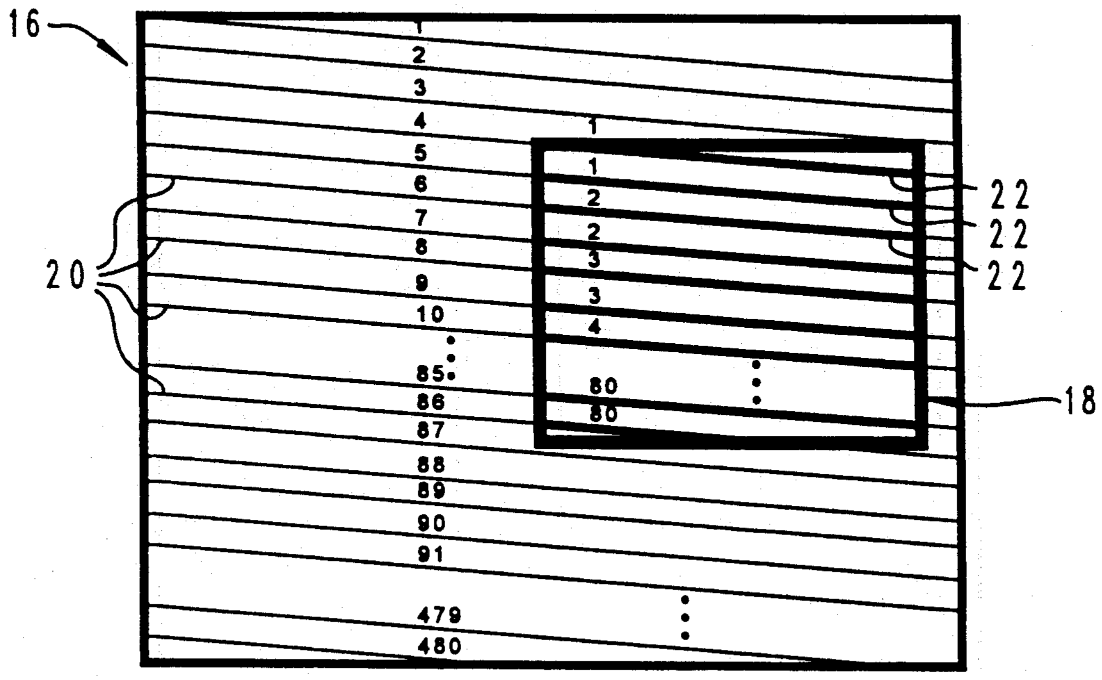
FIG. 2 is a detailed view of a display screen displaying a computer application concurrently with a video image.

FIG. 2 depicts a detailed view of the display screen 16 displaying a computer application concurrently with a video image in a window 18. As can be seen, the computer application displayed on the display screen 16 is comprised of a plurality of lines of computer graphics data 20. The plurality of lines of computer graphics data 20 are shown as "light weight" lines and are numbered 1 through 480. The video image within the window 18 is comprised of a plurality of lines of video data 22. The plurality of lines of video data 22 are illustrated by the "heavy weight" lines and are numbered 1 to 80. Discontinuities in the line counts are indicated by ellipses.

In the preferred embodiment, the location of window 18 is determined by a two step method. First, the horizontal sweep lines on display screen 16 are counted from the top of the screen and compared against a value for the vertical position of the window 18. The next 80 lines of display screen 16 are then utilized for window 18. Second, the horizontal position of window 18 is determined by counting a regenerated Pixel clock during each scan line of display screen 16 and comparing this count against a user supplied value. The next 213 pixels on display screen 16 are then utilized for window 18. These calculations can vary depending upon the type of display 14 used.

A second conversion is required to compress the video image in order to display the video image within the window 18. The second conversion is also needed to synchronize the horizontal sweep of display screen 16 with the horizontal sweep of the video image. In the preferred embodiment, the video image within window 18 is stored in a memory. This allows the video image to be written into the memory synchronized with the video framing, and retrieved from the memory synchronized with display screen 16. Without synchronization of the video image to display screen 16, the video image would "roll."

Tracing of the video image within window 18 occurs after vertical synchronization of display screen 16. In FIG. 2, window 18 begins at line 4 of computer graphics 20 displayed on display screen 16. To display the video image within window 18, successive lines of video data are traced across the full width of display screen 16 until window 18 is reached. Line 1 of video data 22 is then supplied to the display. Since each line of the video data 22 is replicated, line 1 of the video data 22 is repeated at line 5 of computer graphics 20. During lines 6 and 7 of computer graphics 20, line 2 of video data 22 is displayed within window 18. This process continues until the bottom of window 18 is reached.

In the preferred embodiment, window 18 is one-ninth the size of the display screen 16. In order to compress the video image into window 18, two steps are preformed. First, each line of video data 22 from the video image is sampled and written into the memory at one-third the retrieval rate. This compresses the video image horizontally by a factor of three. Next, each group of three lines in the video image are averaged, and the average value is written into the memory as a single line. This compresses the image vertically by a factor of three.

Figure 3:
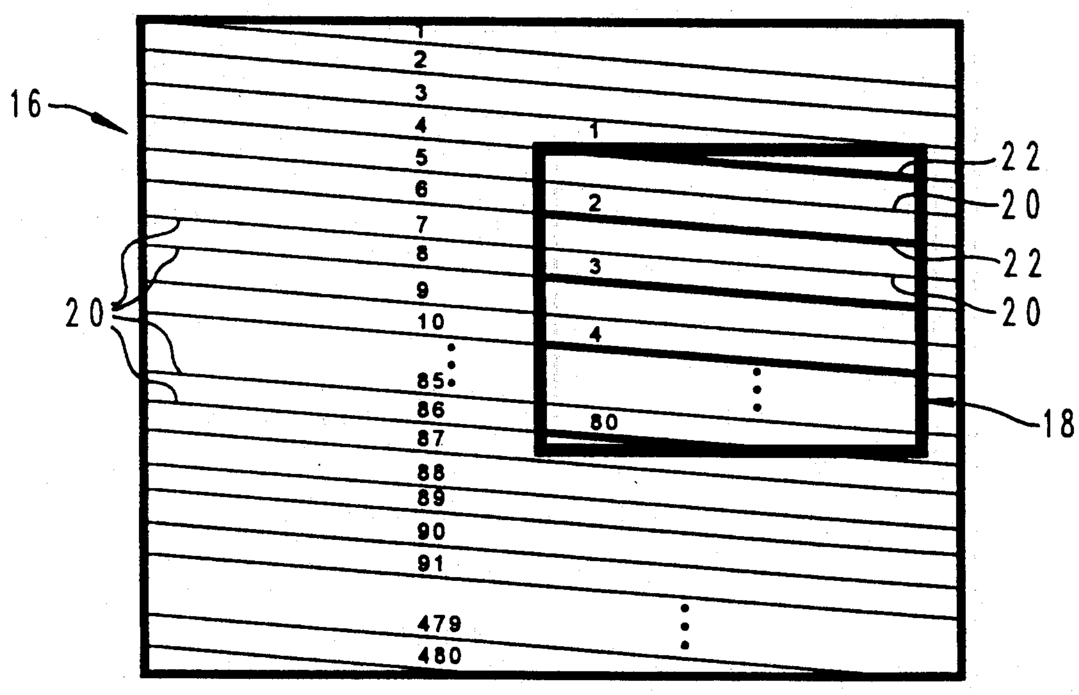
FIG. 3 is a detailed view of a display screen displaying a computer application concurrently with a video image according to the present invention.

FIG. 3 depicts a detailed view of a display screen displaying a computer application concurrently with a video image according to the present invention. FIG. 3 illustrates how a translucent effect can be achieved, allowing data within the computer application to be seen "through" the video image within window 18. The creation of the lines of computer graphics 20 and video data 22 are generated as discussed above in reference to FIG. 2. To create the translucent effect, selected lines of video data 22 within the video image are omitted and not sent to the display screen. Instead of sending each line of video data 22 to display screen 16 twice, each linc of video data 22 is sent to display screen 16 only once. And, where lines of video data 22 are omitted, lines of computer graphics 20 are displayed instead. With each vertical synchronization of the display 14, the lines are switched.

An example of the preferred embodiment is illustrated in FIG. 3 and begins with lines 1 to 80 of the video data 22 traced along the even numbered lines of computer graphics 20. The odd numbered lines of computer graphics 20 are displayed within window 18. On the next vertical synchronization of display 14, lines 1 to 80 of the video data 22 are traced along the odd numbered lines of computer graphics 20, with the even numbered lines of computer graphics 20 displayed within window 18. The next vertical synchronization will cause the lines to revert back to the original pattern. The human eye integrates the two images and the overall effect is that of being able to look "through" the video image and see data within the computer application. This translucent effect is created only in the area where the video image overlays the computer application image.

The translucent effect can be an option selected by the user during programming of the various components which control the video image. This would cause the video image within window 18 to remain translucent until viewing is ended or the translucent effect is turned off. Additionally, it is desirable to have the translucent effect occur automatically when a mouse pointer or cursor has moved into window 18, or whenever there is any other user action, such as displaying the system menu, which would cause information or data to be covered up by window 18.

Those skilled in the art will appreciate that the above described method and system can be utilized with any type or source of video. The source of the video image can be either a channelized source, such as broadcast or cable television, or a base-band output like that supplied by many video cassette recorders and video disc players. Furthermore, although the description of the preferred embodiment discusses the invention with reference to NTSC broadcast video, the invention is not limited to that particular standard. The invention can also be utilized with other standards of video, such as, for example, European television.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for accessing visually obscured data within an application displayed on a display screen, wherein a video image including a plurality of successive lines of video data is displayed substantially throughout a window displayed on said display screen, wherein said window partially overlaps said application and overlies said visually obscured data, said method comprising the steps of:

maintaining the relative location of said video image within said window in relation to said visually obscured data within said application; and temporarily altering said video image within said window to a translucent state by omitting selected ones of said plurality of successive lines of video data, wherein said video image and said visually obscured data within said application are substantially visible throughout said window and wherein said visually obscured data within said application may be viewed through said video image.

2. The method in a data processing system for accessing visually obscured data according to claim 1, wherein said plurality of successive lines of video data include a plurality of odd numbered lines of video data and a plurality of even numbered lines of video data and wherein said step of omitting selected lines of video data comprises omitting said plurality of even numbered lines of video data within said video image.

3. A data processing system for accessing visually obscured data within an application displayed on a display screen, wherein a video image including a plurality of successive lines of video data is displayed substantially throughout a window displayed on said display screen, wherein said window partially overlaps said application and overlies said visually obscured data, said data processing system comprising:

means for maintaining the relative location of said video image within said window in relation to said visually obscured data within said application; and means for temporarily altering said video image within said window to a translucent state by omitting selected ones of said plurality of successive lines of video data, wherein said video image and said visually obscured data within said application are substantially visible throughout said window and wherein said visually obscured data within said application may be viewed through said video image.

4. The data processing system for accessing visually obscured data according to claim 3, wherein said plurality of successive lines of video data include a plurality of odd numbered lines of video data and a plurality of even numbered lines of video data and wherein said means for temporarily altering said video image comprises means for omitting said plurality of even numbered lines of video data within said video image.

* * * * *